United States Patent
O'Coin

(10) Patent No.: US 10,280,964 B2
(45) Date of Patent: May 7, 2019

(54) NUT INSERT WITH REDUCED STRESS

(71) Applicant: HAMILTON SUNDSTRAND CORPORATION, Charlotte, NC (US)

(72) Inventor: James R. O'Coin, Somers, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 409 days.

(21) Appl. No.: 15/043,668

(22) Filed: Feb. 15, 2016

(65) Prior Publication Data

US 2017/0234354 A1   Aug. 17, 2017

(51) Int. Cl.
| | |
|---|---|
| *F16B 37/12* | (2006.01) |
| *B01D 53/00* | (2006.01) |
| *B01D 53/26* | (2006.01) |
| *F16B 37/04* | (2006.01) |

(52) U.S. Cl.
CPC ............ *F16B 37/122* (2013.01); *B01D 53/00* (2013.01); *B01D 53/26* (2013.01); *F16B 37/04* (2013.01); *B01D 2257/504* (2013.01); *B01D 2257/80* (2013.01); *B01D 2259/4575* (2013.01); *F16B 37/041* (2013.01)

(58) Field of Classification Search
CPC .......... F16B 37/02; F16B 37/06; F16B 37/041
USPC ................................. 411/104, 105, 108, 87
See application file for complete search history.

(56) References Cited

U.S. PATENT DOCUMENTS

| | | | | |
|---|---|---|---|---|
| 1,354,309 | A * | 9/1920 | Kruse ...................... | H02G 3/10 248/343 |
| 1,725,790 | A * | 8/1929 | Halagarda ............... | F16B 39/10 411/87 |
| 3,021,162 | A * | 2/1962 | Jahn ........................ | E05C 19/14 292/256 |
| 3,662,783 | A * | 5/1972 | Stacey .................... | F15B 13/02 137/454.5 |
| 5,026,233 | A | 6/1991 | Carothers | |
| 5,624,218 | A * | 4/1997 | Dauwalter ............. | F16B 39/101 411/373 |
| 5,779,412 | A * | 7/1998 | Nagai ..................... | E04B 2/766 411/104 |
| 5,864,998 | A | 2/1999 | Loomer | |
| 6,478,518 | B1 * | 11/2002 | Hwang .................. | F16B 12/14 411/104 |
| 6,494,657 | B2 | 12/2002 | Unsworth | |
| 6,494,659 | B1 | 12/2002 | Lutkus et al. | |
| 8,858,141 | B2 * | 10/2014 | Williams ................. | F16B 7/18 411/104 |
| 9,080,586 | B2 * | 7/2015 | Liu .......................... | F16B 12/14 |
| 9,759,251 | B2 * | 9/2017 | Stanescu ................ | B23G 9/006 |
| 2013/0178145 | A1 * | 7/2013 | Gomez .................. | A23L 3/3418 454/239 |
| 2015/0354616 | A1 * | 12/2015 | Dimelow ................ | F16B 31/00 411/5 |

* cited by examiner

*Primary Examiner* — Gary W Estremsky
(74) *Attorney, Agent, or Firm* — Carlson, Gaskey & Olds, P.C.

(57) ABSTRACT

A nut insert body includes an outer periphery and an aperture formed with threads. The threads are centered on a thread axis. The outer periphery of the nut insert body is curved about a curve axis defined about an axis having at least a component extending in a perpendicular direction from the thread axis. A component receiving a nut insert is also disclosed.

10 Claims, 1 Drawing Sheet

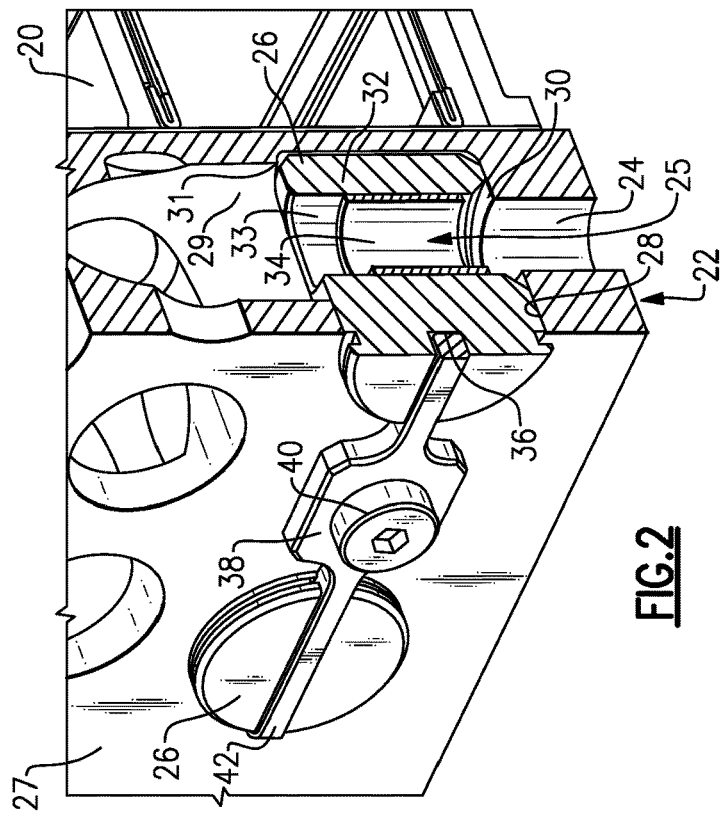
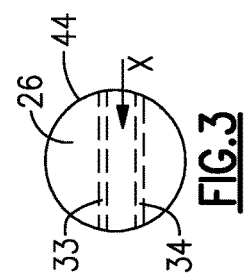
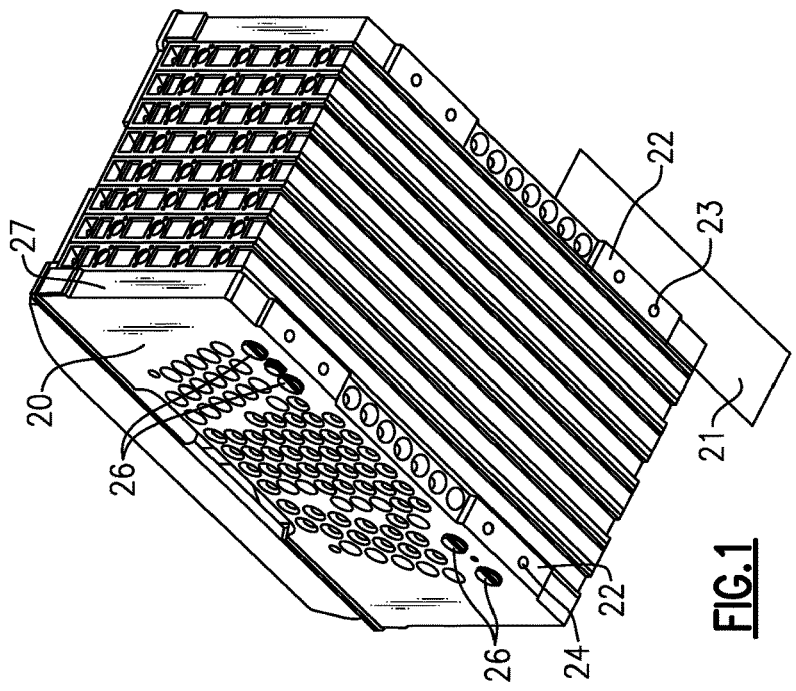

NUT INSERT WITH REDUCED STRESS

STATEMENT REGARDING FEDERALLY SPONSORED RESEARCH OR DEVELOPMENT

This invention was made with government support under Contract No. NNJ06TA25C, awarded by NASA. The Government has certain rights in this invention.

BACKGROUND OF THE INVENTION

This application relates to an insert for providing a threaded nut within a component.

Any number of applications use a nut insert to provide a threaded nut. A nut insert typically includes an aperture which receives threading.

The nut insert is placed within openings in the component and, thus, provides a way of providing the threaded aperture without having to actually work on the component itself to include a threaded aperture.

In the prior art, nut inserts are typically provided of a rectangular shape in a dimension perpendicular to the central axis of the threaded aperture.

SUMMARY OF THE INVENTION

A nut insert body includes an outer periphery and an aperture formed with threads. The threads are centered on a thread axis. The outer periphery of the nut insert body is curved about a curve axis defined about an axis having at least a component extending in a perpendicular direction from the thread axis.

A component receiving a nut insert is also disclosed.

These and other features may be best understood from the following drawings and specification.

BRIEF DESCRIPTION OF THE DRAWINGS

FIG. 1 shows a component to be secured to another component.

FIG. 2 shows a detail of a threaded insert.

FIG. 3 shows an end view of the threaded insert.

DETAILED DESCRIPTION

FIG. 1 discloses a component 20, which may be a component utilized in space applications to remove $CO_2$ and water from breathing air for the occupants of the spacecraft. The component itself is generally as known.

A frame 21 is shown schematically to be secured to a mount area 22 on the components. Bolts 23 are shown securing the frame 21 to the mount area 22 on component 20. The four mount areas 22 are shown to have apertures 24 to receive the bolts 23.

While a particular application is shown, the features disclosed below may have application in any number of other applications that rely upon threaded fasteners.

A nut insert end 26 is shown extending outwardly of an end plate 27.

As shown in FIG. 2, the openings 24 extends inwardly to an open space 25. The nut insert 26 is received within the open space 25. An aperture 28 extends to an outer face of the end plate 27 to receive the nut insert 26.

A ledge 30 is formed on an opposed side of the aperture 24 relative to the opening 28. The ledge 30 extends into a nominal face 29 of space 25, up to an inner end 31. The ledge 30 receives an end portion 32 of the nut insert 26.

A threaded insert 34 is shown within an aperture 33 in the nut insert 26. While the insert 34 is shown as a separate part, it should be understood that the threads could be formed within the actual face of the aperture 33.

A groove 36 is formed in an outer face of the nut insert 26 and receives an insert stay 38, which is otherwise secured by a fastener 40 to the end plate 27. As shown, the insert stay 38 has a central portion receiving the fastener 40 and arms 42 extending within grooves 36 into adjacent nut inserts 26.

As seen in FIG. 3, the nut insert 26 has an outer periphery 44 that is generally circular. The circular shape is defined about an axis extending perpendicularly to an axis X of the aperture 33 and the threads in the insert 34.

While the outer face of the nut insert 26 is shown to be cylindrical, other shapes formed about a curve may come within the scope of this disclosure. Further, while the curve is defined about an axis perpendicular to the axis X, in embodiments the two need not be directly perpendicular. However, the curve should be about an axis having at least a component extending perpendicularly from the central axis X of the aperture 33.

The curved shape provides better stress distribution in component 20 than the prior art rectangular shapes.

The insert stay ensures that the nut insert retained in a proper orientation such that the threads in the insert 34 will properly receive the bolts 23.

In one way of summarizing an embodiment, a first physical component 20 is secured to a second physical component 21. The first component has a first opening 28 extending from one end face and a second opening 24 extending from a second face of the first component. The first and second openings 24/28 extend to communicate with each other and provide a chamber or space 25 to receive a nut insert 26. The nut insert 26 includes an outer periphery 44, and an aperture 33 formed with threads. The threads are centered on a thread axis. The outer periphery 44 of the nut insert 26 is formed about a curve defined about an axis having at least a directional component extending in a perpendicular direction from the thread axis. The outer periphery 44 is received in the first opening 28 and the threaded aperture 33 is aligned with the second opening 24.

There are at least four mount areas 22 each having at least one of the second openings to receive a threaded fastener to secure a frame member 21.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A nut insert comprising:
   a nut insert body having an outer periphery, and an aperture formed with threads, said threads being centered on a thread axis, and said outer periphery of said nut insert body being formed about a curve defined about a curve axis having at least a component extending in a perpendicular direction from said thread axis;
   wherein said curve axis is directly perpendicular to said thread axis;
   wherein said outer periphery is cylindrical;
   an insert stay, and wherein a groove is formed in an outer face of said nut insert body and receives said insert stay; and
   wherein said insert stay has a pair of arms to be received in grooves associated with a pair of said nut insert bodies.

2. A physical component comprising:
a body to be secured to a second physical component, said body comprising a first opening extending from one end face of the body and a second opening extending from a second face of said body, said first and second opening extending to communicate with each other and provide a chamber;
a nut insert body received in said chamber and including an outer periphery, and an aperture formed with threads, said threads being centered on a thread axis, and the outer periphery of said nut insert body being formed about a curve defined about a curve axis having at least a directional component extending in a perpendicular direction from said thread axis, said outer periphery received in said first opening, and said threaded aperture aligned with said second opening; and
wherein an insert stay is secured to said body, and a groove is formed in an outer face of said nut insert body and receives said insert stay.

3. The physical component as set forth in claim 2, wherein said curve axis is directly perpendicular to said thread axis.

4. The physical component as set forth in claim 3, wherein said outer periphery is cylindrical.

5. The physical component as set forth in claim 4, wherein said insert stay has a pair of arms received in grooves associated with a pair of said nut insert bodies.

6. The physical component as set forth in claim 2, wherein said outer periphery is circular.

7. The physical component as set forth in claim 2, wherein said insert stay has a pair of arms received in grooves associated with a pair of said nut insert bodies.

8. The physical component as set forth in claim 2, wherein said chamber further including a ledge on an opposed side of said second opening from a face through which said first opening is formed, and said nut insert extending beyond said second opening to be supported in said ledge space.

9. The physical component as set forth in claim 2, wherein said component is a device for removing carbon dioxide from air.

10. A device for removing carbon dioxide from air comprising:
a frame to be secured to a mount area on a device for removing carbon dioxide from air, and bolts securing said frame to said mount area, with said bolts extending into a nut insert body having an aperture with threads for receiving threads on said bolt, said threads being centered on a thread axis, and an outer periphery of said nut insert body being cylindrical;
an insert stay, and wherein a groove is formed in an outer face of said nut insert body and receives said insert stay; and
wherein said insert stay has a pair of arms to be received in grooves associated with a pair of said nut insert bodies.

* * * * *